United States Patent
An et al.

(10) Patent No.: US 11,833,797 B1
(45) Date of Patent: Dec. 5, 2023

(54) ARAMID COMPOUND PAPER WITH PINNING EFFECT AND PREPARATION METHOD THEREOF

(71) Applicant: Jiangxi Longtai New Material Co., LTD, Ganzhou (CN)

(72) Inventors: Congju An, Ganzhou (CN); Limin An, Ganzhou (CN); Luoxin Wang, Ganzhou (CN)

(73) Assignee: Jiangxi Longtai New Material Co., LTD, Ganzhou (CN)

( * ) Notice: Subject to any disclaimer, the term of this patent is extended or adjusted under 35 U.S.C. 154(b) by 0 days.

(21) Appl. No.: 18/305,355

(22) Filed: Apr. 23, 2023

(30) Foreign Application Priority Data

May 12, 2022 (CN) .......................... 202210515952.1

(51) Int. Cl.
*B32B 37/16* (2006.01)
*B32B 29/02* (2006.01)
(Continued)

(52) U.S. Cl.
CPC .............. *B32B 37/16* (2013.01); *B32B 5/022* (2013.01); *B32B 29/02* (2013.01); *B32B 37/06* (2013.01); *B32B 37/10* (2013.01); *D21H 13/26* (2013.01); *D21H 25/005* (2013.01); B32B 2250/03 (2013.01); B32B 2250/40 (2013.01); B32B 2262/02 (2013.01); B32B 2262/0269 (2013.01); B32B 2305/18 (2013.01); B32B 2307/54 (2013.01); *B32B 2307/718* (2013.01); *B32B 2309/02* (2013.01); *B32B 2309/12* (2013.01);
(Continued)

(58) Field of Classification Search
CPC ........ B32B 2305/18; B32B 2262/0269; B32B 2262/02; B32B 2250/40; B32B 5/022; D21H 25/005; D21H 13/26
See application file for complete search history.

(56) References Cited

FOREIGN PATENT DOCUMENTS

| CN | 1974925 A | 6/2007 |
|----|-----------|--------|
| CN | 105789536 A | 7/2016 |

(Continued)

OTHER PUBLICATIONS

Machine translation of KR 101957537 B1; Publication Mar. 12, 2019.*

*Primary Examiner* — Vishal I Patel
(74) *Attorney, Agent, or Firm* — Nitin Kaushik (57) ABSTRACT

The present invention provides aramid compound paper with a pinning effect and a preparation method for the aramid compound paper. The preparation method for the aramid compound paper includes the following steps: preparing aramid paper from polyphenylene sulfide meltblown superfine fibers and aramid chopped fibers with wet papermaking; then placing polyphenylene sulfide meltblown superfine fiber non-woven fabrics on two sides of aramid base paper as face layers respectively; embedding the polyphenylene sulfide superfine fibers on the face layers into pores of the aramid paper at a middle layer by using a hot-pressing technology to be fusion-joined to the polyphenylene sulfide super-short fibers which are uniformly dispersed in the aramid base paper, so as to form the pinning effect; and meanwhile, melting and then solidifying the polyphenylene sulfide superfine fibers between the aramid chopped fibers to form a continuous network, and firmly bonding the aramid chopped fibers.

4 Claims, 5 Drawing Sheets

(51) Int. Cl.
*B32B 37/06* (2006.01)
*B32B 37/10* (2006.01)
*D21H 13/26* (2006.01)
*D21H 25/00* (2006.01)
*B32B 5/02* (2006.01)

(52) U.S. Cl.
CPC ....... *B32B 2309/14* (2013.01); *B32B 2377/00* (2013.01)

(56) References Cited

FOREIGN PATENT DOCUMENTS

| | | | |
|---|---|---|---|
| CN | 110528314 | A | 12/2019 |
| JP | 2017150095 | A | 8/2017 |
| JP | 2018097346 | A | 6/2018 |

* cited by examiner

ARAMID COMPOUND PAPER WITH PINNING EFFECT AND PREPARATION METHOD THEREOF

CROSS-REFERENCE TO RELATED APPLICATIONS

The application claims priority to Chinese patent application No. 2022105159521, filed on May 12, 2022, the entire contents of which are incorporated herein by reference.

TECHNICAL FIELD

The present invention relates to the technical field of pulping and papermaking, in particular to aramid compound paper with a pinning effect and a preparation method thereof.

BACKGROUND

Polyphenylene sulfide (abbreviated as PPS) is a polymer containing a p-phenylene sulfide repeating structural unit in a molecule and is a kind of high-performance special engineering plastics. The polyphenylene sulfide has the following structural formula:

The polyphenylene sulfide has a glass-transition temperature of 85° C., a heat distortion temperature larger than 260° C. and relatively high heat stability, and may be continuously used at 220° C. The polyphenylene sulfide is excellent in chemical corrosion resistance and is insoluble in most solvents at 170° C. or below. The polyphenylene sulfide has a limit oxygen index of 35-45% and has very good fire resistance and self-extinguishing ability. In addition to those, the PPS has the advantages of good mechanical properties, good size stability of a product, radiation resistance and the like. Thus, the PPS is widely applied to manufacturing electrical parts, automobile parts, precision instrument parts, various model products, laminated materials and the like and has been widely used as special engineering plastics after being filled and modified.

Aramid fibers have been widely applied to the fields of aerospace, rail traffics, national defense military industry and the like due to their excellent mechanical properties, high temperature resistance and insulating performance. Aramid paper is prepared from aramid chopped fibers (abbreviated as ACFs) and aramid fibrids (aramid pulp) with wet papermaking and hot pressing. The aramid paper is widely concentrated as inheriting all the advantages of the aramid fibers and having strong machinability. However, as the aramid fibers have smooth surfaces and are chemically inert, and a melting point of the aramid fibrids or pulp is higher than a decomposition temperature at the same time, the bonding property between the aramid fibers is poor; there are more interior pores; and the comprehensive properties of the prepared aramid paper are poor.

Aramid nano fiber-coated aramid paper and a preparation method therefor are disclosed in the prior art. The method includes the following steps: first, preparing meta-aramid paper by using meta-aramid fibrids and meta-aramid chopped fibers; then, placing aramid nano fibers in a mixed system of dimethyl sulfoxide and potassium hydroxide for stirring to obtain an aramid nano fiber coating liquid; and finally, coating two faces of the meta-aramid paper with the aramid nano fiber coating liquid respectively, and performing hot pressing to obtain the aramid nano fiber-coated aramid paper. The method improves the insulating performance of the aramid paper to a certain degree; however, a complex preparation process of the aramid nano fibers and how to ensure the retention rate of the nano fibers in the paper are still challenges. A high-performance aramid compound paper based material and a preparation method and an application therefor are further disclosed in the prior art. The method includes the following steps: first, modifying the surfaces of the aramid fibers to obtain aminosylated aramid fibers; then modifying cellulose nanofibrils to obtain hydroformylated cellulose nanofibrils; and using amino groups to conduct a Schiff base reaction with aldehyde groups for full crosslinking to obtain a high-performance aramid paper based material. While the method improves the mechanical properties and the insulating performance of the aramid paper based material to a certain degree, the modification processes of the aramid fibers and the cellulose nano fibers are complex, involving use of a great quantity of organic solvents and strong acid and alkali. Therefore, the method is difficult to produce the high-performance aramid paper in a large scale in actual industrialization.

Through above analysis, there are problems and defects in the prior art: while modification on the aramid fibers can improve the performance of the aramid paper to a certain degree, a complex modification operation and use of a great quantity of the organic solvents and the strong acid and alkali result in difficulties in large-scale preparation of the high-performance aramid paper. In addition, existing aramid paper still has a large porosity, and it is difficult to further increase its breakdown voltage. Addition of the aramid nano fibers in the aramid paper can effectively improve the performance of the aramid paper. However, preparing the aramid nano fibers and how to ensure the retention rate of the nano fibers in the aramid paper are still very difficult in industrial production.

Based on the defects in the current aramid paper, there is a need for improve the above difficulties.

SUMMARY

In view of this, the present invention provides aramid compound paper with a pinning effect and a preparation method thereof, so as to solve the above problems or at least partially solve the above problems.

In a first aspect, the present invention provides aramid compound paper with a pinning effect, including:
aramid paper;
polyphenylene sulfide meltblown superfine fiber non-woven fabrics, located on two sides of the aramid paper respectively, wherein side faces of the polyphenylene sulfide meltblown superfine fiber non-woven fabrics are embedded into pores of the aramid paper.

Preferably, for the aramid compound paper with the pinning effect, the aramid paper is prepared from polyphenylene sulfide superfine and super-short fibers and aramid chopped fibers with wet papermaking.

In a second aspect, the present invention further provides a preparation method for the aramid compound paper with the pinning effect, including the following steps:
providing aramid paper and polyphenylene sulfide meltblown superfine fiber non-woven fabrics;

bonding the polyphenylene sulfide meltblown superfine fiber non-woven fabrics to two sides of the aramid paper respectively, and then placing the bonded aramid paper in a roller press for hot pressing at a temperature of 100-240° C., a pressure of 0.1-0.5 MPa and a linear speed of 1-20 m/min, to obtain the aramid compound paper with the pinning effect.

Preferably, for the preparation method for the aramid compound paper with the pinning effect, a preparation method for the aramid paper includes the following steps:

mixing the aramid chopped fibers and the polyphenylene sulfide superfine and super-short fibers to obtain mixed fibers;

then, placing the mixed fibers in a fiber dissociator for dissociation;

adding a dispersing agent in the dissociated mixed fibers for stirring to obtain mixed pulp;

placing the mixed pulp in a paper former for papermaking forming, and then performing drying to obtain the aramid paper.

Preferably, in the preparation method for the aramid compound paper with the pinning effect, a preparation method for the dispersing agent includes the following step: adding polyoxyethylene and polyacrylamide to water for stirring to obtain dispersing agent.

Preferably, in the preparation method for the aramid compound paper with the pinning effect, during dissociation, a rotating speed of the dissociator is controlled at 3000-7000 r/min, and a dissociation time is controlled at 10-30 min.

Preferably, in the preparation method for the aramid compound paper with the pinning effect, a mass ratio of the polyoxyethylene, the polyacrylamide, the water, aramid chopped fibers and the polyphenylene sulfide superfine fibers is (1-4): (0.2-0.6): (1800-2200): (6-10): (2-5).

Preferably, in the preparation method for the aramid compound paper with the pinning effect, the aramid chopped fibers include at least one of para-aramid chopped fibers, meta-aramid chopped fibers and heterocyclic aramid chopped fibers.

Preferably, after the step of placing the mixed pulp in a paper former for papermaking forming, and then performing drying, the preparation method for the aramid compound paper with the pinning effect further includes the step: placing the dried aramid paper in a roller press for hot pressing at a temperature of 220-260° C., a pressure of 0.1-0.5 MPa and a linear speed of 1-5 m/min to obtain the aramid paper.

Preferably, in the preparation method for the aramid compound paper with the pinning effect, the mixed pulp is placed in a paper former for papermaking forming, and then dried to obtain the aramid paper, wherein a drying temperature is 80-120° C., and a drying time is 0.5-2 h;

a weight of the polyphenylene sulfide meltblown superfine fiber non-woven fabrics is 20-50 g/m$^2$.

Compared with the prior art, the aramid compound paper with the pinning effect and the preparation method therefor of the present invention has the following beneficial effects:

In the preparation method for the aramid compound paper with the pinning effect of the present invention, the aramid paper is prepared from the polyphenylene sulfide meltblown superfine fibers and the aramid chopped fibers with wet papermaking; then polyphenylene sulfide meltblown superfine fiber non-woven fabrics are placed on two sides of aramid base paper as face layers respectively; the polyphenylene sulfide superfine fibers on the face layers are embedded into pores of the aramid paper at a middle layer by using a hot-pressing technology to be fusion-joined to polyphenylene sulfide super-short fibers which are uniformly dispersed in the aramid base paper, so as to form the pinning effect; and meanwhile, the polyphenylene sulfide superfine fibers between the aramid chopped fibers are melted and then solidified to form a continuous network, and the aramid chopped fibers are firmly bonded to obtain the aramid compound paper of a sandwich structure with complete close fusion of the face layers and the middle layer. The method of the present invention is simple without using any organic solvent, and is safe and environmentally friendly. The prepared aramid compound paper is of a dense structure, is close in interlayer bonding and flat and smooth in surface, and may remarkably improve the mechanical properties and the electrical insulating performance of the aramid paper. By using the preparation method for the aramid compound paper of the present invention, there is no need for any modification on the aramid fibers, use of the organic solvents or the strong acid and alkali and addition of a nanofiller; and by designing and preparing the aramid paper into the sandwich structure, the mechanical properties and the electrical insulating performance of the aramid paper can be greatly improved.

BRIEF DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely some embodiments of the present invention, and for those ordinary skilled in the art, other drawings can also be obtained according to these drawings without contributing creative labor.

DETAILED DESCRIPTION OF THE EMBODIMENTS

A technical solution in implementation modes of the present invention is clearly and fully described below in combination with the implementation modes of the present invention. Apparently, the described implementation modes are merely part of the implementation modes of the present invention, not all of the implementation modes. Based on the implementation modes in the present invention, all other implementation modes obtained by those ordinary skilled in the art without contributing creative labor will belong to the protection scope of the present invention.

Figure 1:
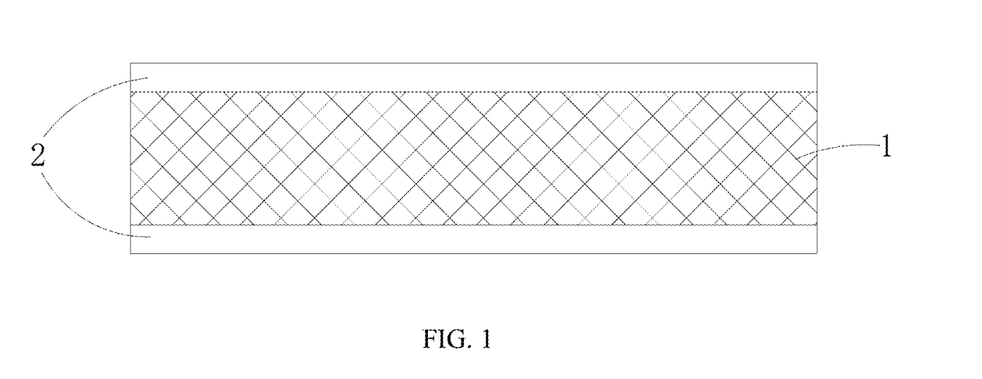
FIG. 1 is a structural schematic diagram of aramid compound paper with a pinning effect of the present invention.

The embodiments of the present application provide aramid compound paper with a pinning effect, as shown in FIG. 1, including:

aramid paper 1;

polyphenylene sulfide meltblown superfine fiber non-woven fabrics 2, located on two sides of the aramid paper 1 respectively, wherein side faces of the polyphenylene sulfide meltblown superfine fiber non-woven fabrics 2 are embedded into pores of the aramid paper 1.

The aramid compound paper with the pinning effect of the present application includes the aramid paper 1 and the polyphenylene sulfide meltblown superfine fiber non-woven fabrics 2 located on the two sides of the aramid paper 1; that is, the aramid compound paper is of the sandwich structure, wherein the aramid paper 1 is located in the middle, and the polyphenylene sulfide meltblown superfine fiber non-woven fabrics 2 are located on the upper side and the lower side of the aramid paper 1. Specifically, by pressing the polyphenylene sulfide meltblown superfine fiber non-woven fabrics 2 and the aramid paper 1 through a hot-pressing mode, one sides of the polyphenylene sulfide meltblown superfine fiber non-woven fabrics 2 are embedded into pores of the aramid paper 1; and then polyphenylene sulfide of the polyphenylene sulfide meltblown superfine fiber non-woven fabrics 2 is embedded into the pores of the aramid paper 1 to form the pinning effect, so that the hole defect of paper is greatly reduced; and the density of the aramid paper is remarkably improved. In addition, the polyphenylene sulfide meltblown superfine fiber non-woven fabrics 2 are closely fused to the aramid paper 1; the aramid compound paper is flat and smooth in surface, high in electric breakdown voltage and excellent in electrical insulating performance.

In some embodiments, the aramid paper 1 is prepared from polyphenylene sulfide superfine and super-short fibers and aramid chopped fibers with wet papermaking.

Figure 2:
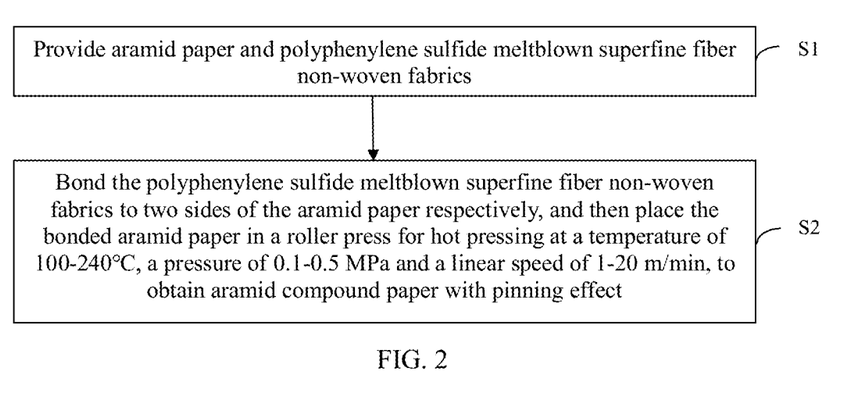
FIG. 2 is a flow chart of a preparation method for aramid compound paper with a pinning effect of the present invention.

Based on the same concept of the present invention, the embodiments of the present application provide a preparation method for aramid compound paper with a pinning effect, as shown in FIG. 2, including the following steps:

S1, providing aramid paper and polyphenylene sulfide meltblown superfine fiber non-woven fabrics;

S2, bonding the polyphenylene sulfide meltblown superfine fiber non-woven fabrics to two sides of the aramid paper respectively, and then placing the bonded aramid paper in a roller press for hot pressing at a temperature of 100-240° C., a pressure of 0.1-0.5 MPa and a linear speed of 1-20 m/min, to obtain the aramid compound paper with the pinning effect.

Figure 3:
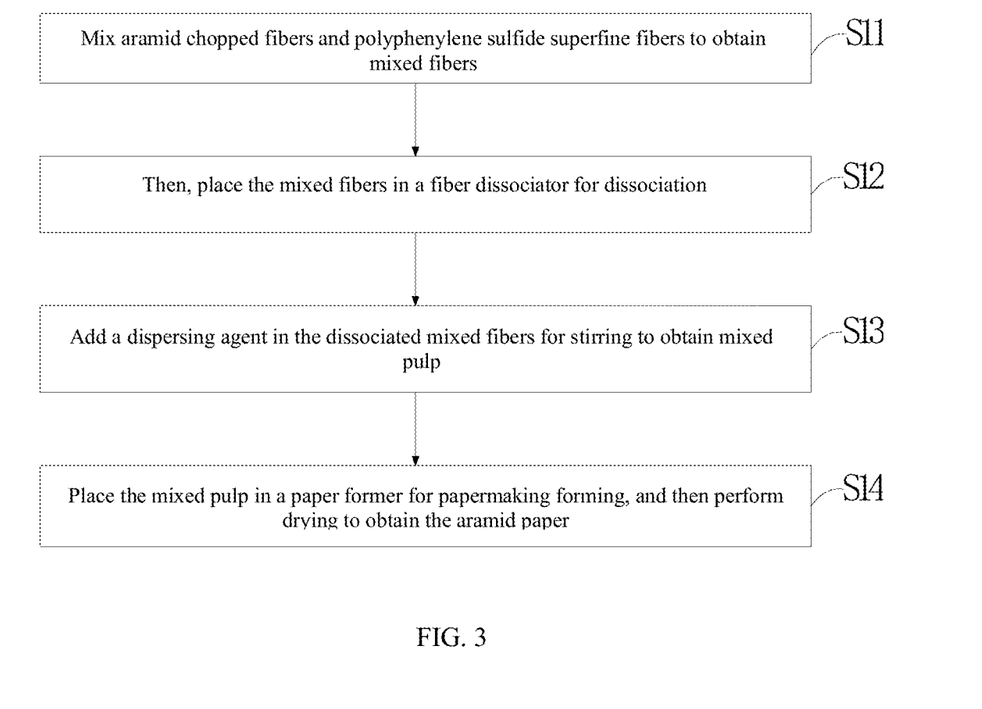
FIG. 3 is a flow chart of a preparation method for aramid paper of the present invention.

In some embodiments, as shown FIG. 3, the preparation method for the aramid paper includes the following steps:

S11, mixing the aramid chopped fibers and the polyphenylene sulfide superfine and super-short fibers to obtain mixed fibers;

S12, then, placing the mixed fibers in a fiber dissociator for dissociation;

S13, adding a dispersing agent in the dissociated mixed fibers for stirring to obtain mixed pulp;

S14, placing the mixed pulp in a paper former for papermaking forming, and then performing drying to obtain the aramid paper.

In some embodiments, polyphenylene sulfide superfine fibers are prepared by melt-blowing polyphenylene sulfide resin to obtain a superfine fiber assembly and then performing wet mechanical grinding.

In some embodiments, a preparation method for the dispersing agent includes the following step: adding polyoxyethylene and polyacrylamide to water for stirring to obtain the dispersing agent.

In some embodiments, during dissociation, a rotating speed of the dissociator is 3000-7000 r/min, and a dissociation time is 10-30 min.

In some embodiments, a mass ratio of the polyoxyethylene, the polyacrylamide, the water, aramid chopped fibers and the polyphenylene sulfide superfine fibers is (1-4): (0.2-0.6): (1800-2200): (6-10): (2-5).

In some embodiments, the aramid chopped fibers include at least one of para-aramid chopped fibers, meta-aramid chopped fibers and heterocyclic aramid chopped fibers.

In some embodiments, after the step of placing the mixed pulp in a paper former for papermaking forming, and then performing drying, the preparation method for the aramid compound paper with the pinning effect further includes the steps: placing the dried aramid paper in a roller press for hot pressing at a temperature of 220-260° C., a pressure of 0.1-0.5 MPa and a linear speed of 1-5 m/min to obtain the aramid paper; and then bonding the polyphenylene sulfide meltblown superfine fiber non-woven fabrics to two sides of the aramid paper, and performing hot pressing to obtain the aramid compound paper with the pinning effect.

In some embodiments, in the step of placing the mixed pulp in a paper former for papermaking forming, and then performing drying to obtain the aramid paper, a drying temperature is 80-120° C., and a drying time is 0.5-2 h;

a weight of the polyphenylene sulfide meltblown superfine fiber non-woven fabrics is 20-50 g/m².

In the preparation method for the aramid compound paper of the present application, the aramid paper is prepared from the polyphenylene sulfide meltblown superfine fibers and the aramid chopped fibers with wet papermaking; then polyphenylene sulfide meltblown superfine fiber non-woven fabrics are placed on two sides of aramid base paper as face layers respectively; the polyphenylene sulfide superfine fibers on the face layers are embedded into pores of the aramid paper at a middle layer by using a hot-pressing technology to be fusion-joined to polyphenylene sulfide super-short fibers which are uniformly dispersed in the aramid base paper, so as to form the pinning effect; and meanwhile, the polyphenylene sulfide superfine fibers between the aramid chopped fibers are melted and then solidified to form a continuous network, and the aramid chopped fibers are firmly bonded to obtain the aramid compound paper of a sandwich structure with complete close fusion of the face layers and the middle layer. The method of the present invention is simple without using any organic solvent, and is safe and environmentally friendly. The prepared aramid compound paper is of a dense structure, is close in interlayer bonding and flat and smooth in surface and, may remarkably improve the mechanical properties and the electrical insulating performance of the aramid paper. By using the preparation method for the aramid compound paper of the present invention, there is no need for any modification on the aramid fibers, use of the organic solvents or the strong acid and alkali and addition of a nanofiller; and by designing and preparing the aramid paper into the sandwich structure, the mechanical properties and the electrical insulating performance of the aramid paper can be greatly improved.

The preparation method for the aramid compound paper with the pinning effect of the present application will be further described below with specific embodiments. This section further describes the content of the present invention in combination with the specific embodiments which should not be construed as limiting of the present invention. If not otherwise specified, the technical means used in the embodiments are conventional means well known by those skilled in the art. Unless otherwise specified, the reagents, the methods and the devices used in the present invention are conventional reagents, methods and devices in the art.

The para-aramid chopped fibers used in the following embodiments are purchased from China Bluestar Chengrand Research Institute of Chemical Industry; the polyphenylene sulfide superfine fiber non-woven fabrics may be commercially available and may also be prepared by a melt spinning method; and the polyphenylene sulfide superfine and super-short fibers may be commercially available, may also be prepared by a mechanical pulping method and may also be prepared by using a preparation method for the polyphenylene sulfide superfine and super-short fibers of the applied patent.

Embodiment 1

The embodiment of the present application provides aramid compound paper with a pinning effect. The aramid compound paper is prepared by the following steps:

S1, mixing 8.07 g of para-aramid chopped fibers and 3.5 g of polyphenylene sulfide superfine fibers to obtain mixed fibers;

S2, placing the mixed fibers in a fiber dissociator for dissociation for 10 min at a rotating speed of 5040 r/min;

S3, adding 2.4 g of polyoxyethylene, 0.4 g of polyacrylamide to 2 kg of water for stirring for 5 h at a rotating speed of 350 rpm, to obtain a dispersing agent;

S4, adding the dispersing agent in the dissociated mixed fibers in step S2 for uniform stirring to obtain mixed pulp;

S5, placing the mixed pulp in a paper former for paper-making forming to obtain wet para-aramid paper, and then placing the wet para-aramid paper in an air blast drying box for drying for 1 h at 110° C.;

S6, placing the dried para-aramid paper in step S5 in a roller press for hot pressing at a temperature of 240° C., a pressure of 0.1 MPa and a rolling linear speed of 1 m/min;

S7, bonding 20 g/m² polyphenylene sulfide meltblown superfine fiber non-woven fabrics to two sides of the hot pressed para-aramid paper in step S6, then placing the bonded para-aramid paper in a roller press for hot pressing at a temperature of 100° C., a pressure of 0.5 MPa and a rolling linear speed of 20 m/min, to obtain the aramid compound paper with the pinning effect.

Through a test, the tensile strength of the aramid compound paper prepared in embodiment 1 reaches 122 N/cm, and a breakdown voltage is 38 kV/mm.

Embodiment 2

The embodiment of the present application provides aramid compound paper with a pinning effect. The aramid compound paper is prepared by the following steps:

S1, mixing 8.07 g of para-aramid chopped fibers and 3.5 g of polyphenylene sulfide superfine fibers to obtain mixed fibers;

S2, placing the mixed fibers in a fiber dissociator for dissociation for 10 min at a rotating speed of 5040 r/min;

S3, adding 2.4 g of polyoxyethylene, 0.4 g of polyacrylamide to 2 kg of water for stirring for 5 h at a rotating speed of 350 rpm, to obtain a dispersing agent;

S4, adding the dispersing agent in the dissociated mixed fibers in step S2 for uniform stirring to obtain mixed pulp;

S5, placing the mixed pulp in a paper former for paper-making forming to obtain wet para-aramid paper, and then placing the wet para-aramid paper in an air blast drying box for drying for 1 h at 110° C.;

S6, placing the dried para-aramid paper in step S5 in a roller press for hot pressing at a temperature of 240° C., a pressure of 0.1 MPa and a rolling linear speed of 1 m/min;

S7, bonding 30 g/m² polyphenylene sulfide meltblown superfine fiber non-woven fabrics to two sides of the hot pressed para-aramid paper in step S6, then placing the bonded para-aramid paper in a roller press for hot pressing at a temperature of 200° C., a pressure of 0.3 MPa and a rolling linear speed of 16 m/min, to obtain the aramid compound paper with the pinning effect.

Through a test, the tensile strength of the aramid compound paper prepared in embodiment 2 reaches 161 N/cm, and a breakdown voltage is 45 kV/mm.

Embodiment 3

The embodiment of the present application provides aramid compound paper with a pinning effect. The aramid compound paper is prepared by the following steps:

S1, mixing 8.07 g of para-aramid chopped fibers and 3.5 g of polyphenylene sulfide superfine fibers to obtain mixed fibers;

S2, placing the mixed fibers in a fiber dissociator for dissociation for 10 min at a rotating speed of 5040 r/min;

S3, adding 2.4 g of polyoxyethylene, 0.4 g of polyacrylamide to 2 kg of water for stirring for 5 h at a rotating speed of 350 rpm, to obtain a dispersing agent;

S4, adding the dispersing agent in the dissociated mixed fibers in step S2 for uniform stirring to obtain mixed pulp;

S5, placing the mixed pulp in a paper former for paper-making forming to obtain wet para-aramid paper, and then placing the wet para-aramid paper in an air blast drying box for drying for 1 h at 110° C.;

S6, placing the dried para-aramid paper in step S5 in a roller press for hot pressing at a temperature of 240° C., a pressure of 0.1 MPa and a rolling linear speed of 1 m/min;

S7, bonding 40 g/m² polyphenylene sulfide meltblown superfine fiber non-woven fabrics to two sides of the hot pressed para-aramid paper in step S6, then placing the bonded para-aramid paper in a roller press for hot pressing at a temperature of 220° C., a pressure of 0.35 MPa and a rolling linear speed of 10 m/min, to obtain the aramid compound paper with the pinning effect.

Through a test, the tensile strength of the aramid compound paper prepared in embodiment 3 reaches 158 N/cm, and a breakdown voltage is 43 kV/mm.

Embodiment 4

The embodiment of the present application provides aramid compound paper with a pinning effect. The aramid compound paper is prepared by the following steps:

S1, mixing 8.07 g of para-aramid chopped fibers and 3.5 g of polyphenylene sulfide superfine fibers to obtain mixed fibers;

S2, placing the mixed fibers in a fiber dissociator for dissociation for 10 min at a rotating speed of 5040 r/min;

S3, adding 2.4 g of polyoxyethylene, 0.4 g of polyacrylamide to 2 kg of water for stirring for 5 h at a rotating speed of 350 rpm, to obtain a dispersing agent;

S4, adding the dispersing agent in the dissociated mixed fibers in step S2 for uniform stirring to obtain mixed pulp;

S5, placing the mixed pulp in a paper former for paper-making forming to obtain wet para-aramid paper, and then placing the wet para-aramid paper in an air blast drying box for drying for 1 h at 110° C.;

S6, placing the dried para-aramid paper in step S5 in a roller press for hot pressing at a temperature of 240° C., a pressure of 0.1 MPa and a rolling linear speed of 1 m/min;

S7, bonding 50 g/m² polyphenylene sulfide meltblown superfine fiber non-woven fabrics to two sides of the hot pressed para-aramid paper in step S6, then placing the bonded para-aramid paper in a roller press for hot pressing at a temperature of 240° C., a pressure of 0.1 MPa and a rolling linear speed of 1 m/min, to obtain the aramid compound paper with the pinning effect.

Through a test, the tensile strength of the aramid compound paper prepared in embodiment 4 reaches 162 N/cm, and a breakdown voltage is 48 kV/mm.

Figure 4:
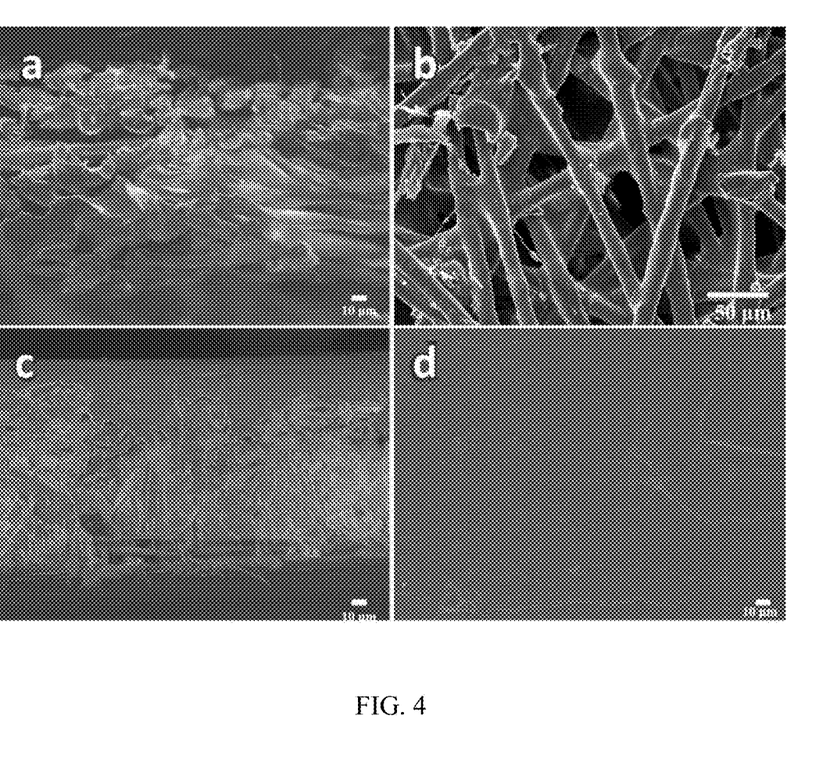
FIG. 4 is a diagram showing electron micrographs of cross sections and surfaces of aramid compound paper and aramid paper prepared in embodiment 1 of the present invention.

Performance Test a-b in FIG. 4 show scanning electron micrographs of a cross section and a surface of aramid paper without a sandwich structure formed in embodiment 1 (that is, the aramid paper formed after hot pressing in step S6) respectively, wherein the cross section electron micrograph a in FIG. 4 embodies that bonding between fibers of the aramid paper is not close enough, while the surface electron micrograph b in FIG. 4 embodies that there are more pores in the aramid paper.

c-d in FIG. 4 are scanning electron micrographs of a cross section and a surface of aramid paper of a sandwich structure prepared in embodiment 1 respectively, wherein the cross section electron micrograph c in FIG. 4 embodies that in the aramid compound paper of the sandwich structure, upper and lower surfaces are polyphenylene sulfide meltblown superfine fiber non-woven fabrics, a middle layer is aramid paper and is of a dense structure without obvious pores; and the surface electron micrograph d in FIG. 4 embodies that the surface of the aramid compound paper is of a flat and dense structure.

Figure 5:
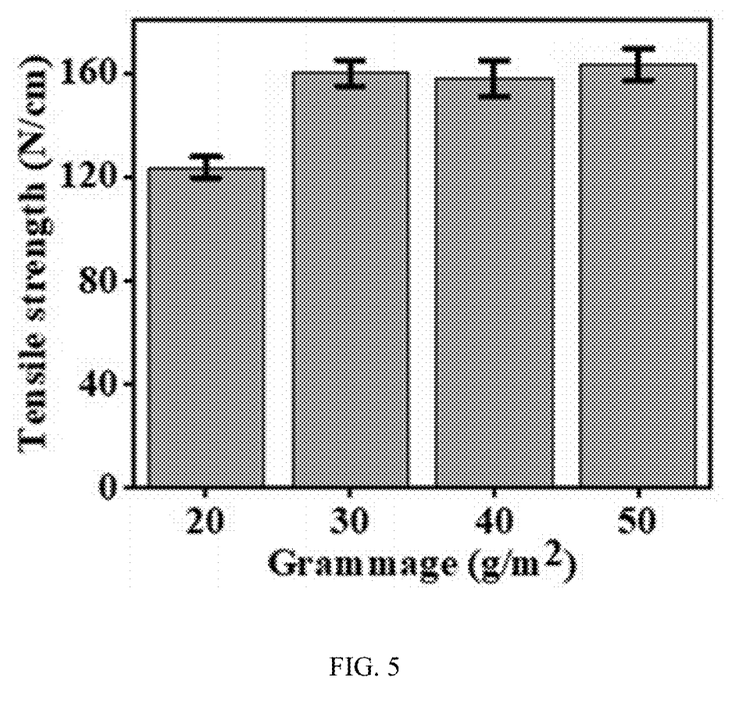
FIG. 5 is a tensile strength diagram aramid compound paper prepared in embodiments 1-4 of the present invention.

A comparison result of tensile strength of the aramid compound paper with the pinning effect prepared in embodiments 1-4 is shown in FIG. 5. The abscissa in FIG. 5 represents a weight of the polyphenylene sulfide meltblown superfine fiber non-woven fabrics by gram.

It can be seen from FIG. 5, in embodiment 4, the aramid compound paper prepared from 50 g/m² polyphenylene sulfide meltblown superfine fiber non-woven fabrics has the highest tensile strength of 162 N/cm.

The above only describes preferred exemplary implementation modes of the present invention and is not intended to be limiting of the present invention, and any modifications, equivalent substitutions, improvements and the like within the spirit and principles of the present invention are intended to be embraced by the protection range of the present invention.

What is claimed is:

1. A preparation method for aramid compound paper with a pinning effect, comprising a following steps:
providing aramid paper and polyphenylene sulfide meltblown superfine fiber non-woven fabrics;
bonding the polyphenylene sulfide meltblown superfine fiber non-woven fabrics to two sides of the aramid paper respectively, and then placing the bonded aramid paper in a roller press for hot pressing at a temperature of 100-240° C., a pressure of 0.1-0.5 MPa and a linear speed of 1-20 m/min, to obtain the aramid compound paper with the pinning effect;
a preparation method for the aramid paper comprises a following steps:
mixing a aramid chopped fibers and a polyphenylene sulfide superfine and super-short fibers to obtain mixed fibers;
then, placing the mixed fibers in a fiber dissociator for dissociation;
adding a dispersing agent in the dissociated mixed fibers for stirring to obtain mixed pulp;
placing the mixed pulp in a paper former for papermaking forming, and then performing drying to obtain the aramid paper;
a preparation method for the dispersing agent comprises a following step: adding polyoxyethylene and polyacrylamide to water for stirring to obtain dispersing agent;
a mass ratio of the polyoxyethylene, the polyacrylamide, a water, the aramid chopped fibers and the polyphenylene sulfide superfine fibers is (1-4): (0.2-0.6): (1800-2200): (6-10): (2-5);
after the step of placing the mixed pulp in a the paper former for papermaking forming, and then performing drying, the preparation method for the aramid compound paper with the pinning effect further comprises the step: placing the dried aramid paper in a roller press for hot pressing at a temperature of 220-260° C., a pressure of 0.1-0.5 MPa and a linear speed of 1-5 m/min to obtain the aramid paper;
a weight of the polyphenylene sulfide meltblown superfine fiber non-woven fabrics is 20-50 g/m².

2. The preparation method for the aramid compound paper with the pinning effect according to claim 1, wherein during dissociation, a rotating speed of the dissociator is controlled at 3000-7000 r/min, and a dissociation time is controlled at 10-30 min.

3. The preparation method for the aramid compound paper with the pinning effect according to claim 1, wherein the aramid chopped fibers comprise at least one of para-aramid chopped fibers, meta-aramid chopped fibers and heterocyclic aramid chopped fibers.

4. The preparation method for the aramid compound paper with the pinning effect according to claim 1, wherein the mixed pulp is placed in a paper former for papermaking forming, and then dried to obtain the aramid paper, wherein a drying temperature is 80-120° C., and a drying time is 0.5-2 h.

* * * * *